US005092023A

United States Patent [19]

Boncoeur et al.

[11] Patent Number: 5,092,023

[45] Date of Patent: Mar. 3, 1992

[54] PROCESS FOR THE PRODUCTION OF PARTS HAVING A CAVITY BY PRESSING

[75] Inventors: Marcel Boncoeur, Paris; Frédéric Valin, Limours, both of France

[73] Assignee: Commissariat a l'Energie Atomique, Paris, France

[21] Appl. No.: 616,324

[22] Filed: Nov. 21, 1990

[30] Foreign Application Priority Data

Nov. 24, 1989 [FR] France ................................ 89 15479

[51] Int. Cl.[5] ................................................ B23P 17/00

[52] U.S. Cl. .................................. 29/400.1; 29/527.1; 29/527.6; 264/112; 264/313; 419/66; 419/67; 425/DIG. 44; 425/DIG. 124

[58] Field of Search ............................... 264/313, 112; 425/DIG. 44, DIG. 124; 29/527.1, 527.6, 898.049, 898.05, 898.055, 400.1; 419/61, 66, 67

[56] References Cited

U.S. PATENT DOCUMENTS 1,637,707 8/1927 Porter ................................ 264/313

FOREIGN PATENT DOCUMENTS 887615 6/1981 Belgium .
002918 7/1979 European Pat. Off. .
3343210 1/1985 Fed. Rep. of Germany .
62-110899 5/1987 Japan .

*Primary Examiner*—David A. Simmons
*Assistant Examiner*—Merrick Dixon
*Attorney, Agent, or Firm*—Michael N. Meller

[57] ABSTRACT

A process for the production of, in particular, ceramic parts having a cavity by press molding or pressing sealed sheaths.

The core used for defining the cavity and preventing subsequent machining operations is initially more voluminous than the desired cavity and has an adequate ductility to allow partial extrusion during pressing. This avoids often excessive mechanical stresses, which can lead to a bursting or shattering of the densified part when the sheath is removed. This process has, application to the hot isostatic pressing of fragile materials.

3 Claims, 2 Drawing Sheets

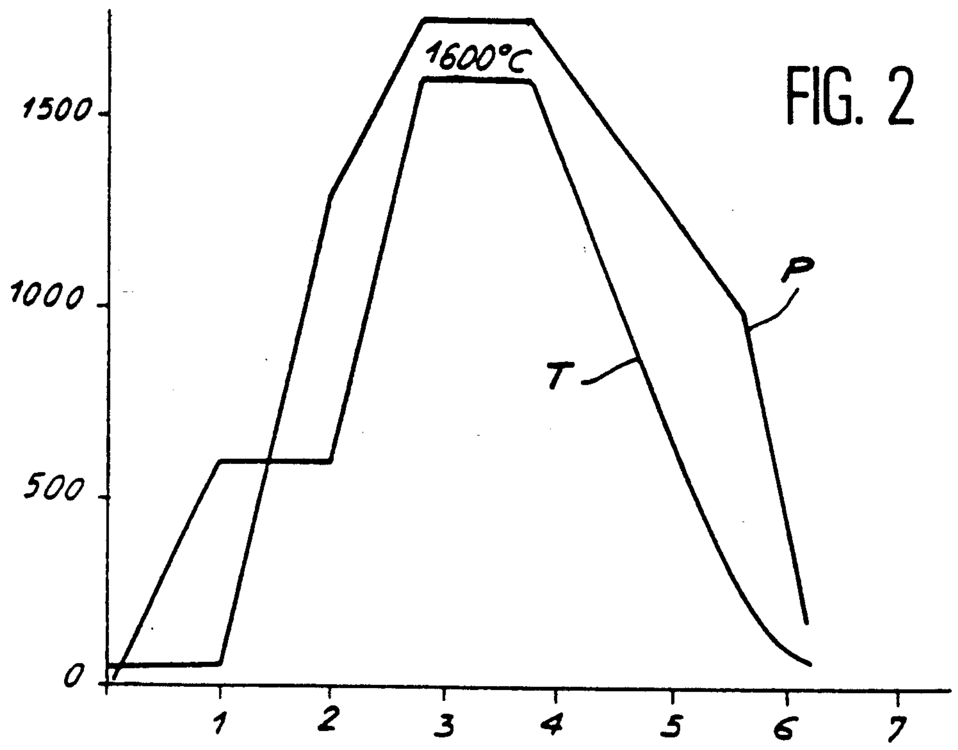
FIG. 2
FIG. 3 A
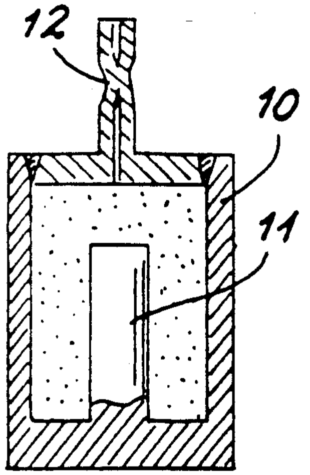
FIG. 3 B
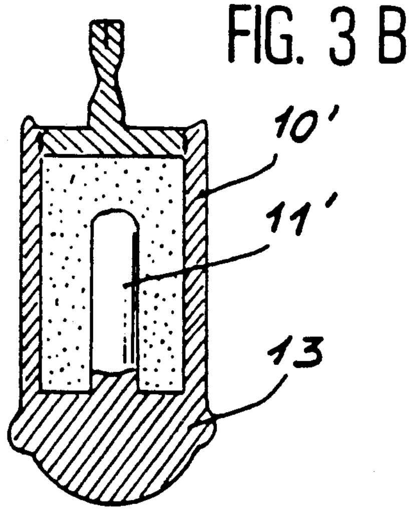
FIG. 3 C
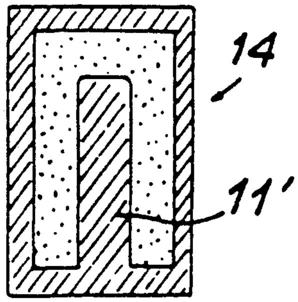
FIG. 3 D
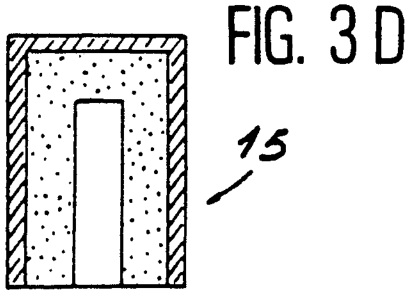

PROCESS FOR THE PRODUCTION OF PARTS HAVING A CAVITY BY PRESSING

The invention relates to a process for the production of parts having a cavity by press molding or pressing.

A standard process, known as hot isostatic pressing for the production of non-moldable material parts consists of pressing a sealed, deformable sheath filled with powder of said material by a hydrostatic pressure. In conjunction, with the accompanying heating, the pressure brings about a sintering of the powder by compression or densification. The sheath is then slit and discarded and the part can be brought to the correct dimensions by a finishing machining operation. Isostatic pressing without heating also exists.

In the case of parts having a cavity and whereof a typical example is the crucible, it is sometimes decided to press a solid part, i.e. whose sheath follows the external contours, but not the contour of the cavity, which is shaped by machining after pressing. This solution is not in principle particularly satisfactory, because the materials used often do not machine very well due to their fragility and hardness. It is difficult to obtain an adequate surface state, both by the cutting tool and by the abrasive tool and there is a high cutting tool consumption. In addition, frequently the mechanical stresses of machining break or shatter the parts.

Another solution consists of placing in the sheath, prior to the filling thereof, a non-deformable core which defines the cavity. The cores used in casting have an identical function, but the problems caused by pressing are different, because significant mechanical stresses develop in the sheath, the core and in the part as soon as the powder takes on its consistency.

Certain of these stresses are due to thermal expansion differences between the part and the sheath on the one hand and the part and the core on the other. At least in certain cases, it is possible to obviate this problem by choosing materials having similar expansion coefficients. The sheath and the core then advantageously covered by an anti-adhesive coating, which facilitates mold removal. It is also possible to reduce stresses in the part by an appropriate choice of the temperature and the pressure cycles. This avoids cracks and fractures prior to sheath removal.

However, there is still a phenomenon for which it is impossible to compensate. This is the contraction of the core during densification and its expansion when again placed under atmospheric pressure and particularly after sheath removal. The stresses produced tend to expand the part, particularly when the sheath has been removed, which makes it possible to apply an opposite compression stress. If the material of the part is sufficiently ductile the part deforms, but its shattering is inevitable in the case of a fragile material.

The invention seeks to overcome this problem and make possible powder pressing of fragile materials in sheaths in order to directly obtain parts having a cavity.

The process is characterized in that the core is initially of a volume greater than that of the cavity volume and undergoes a partial extrusion outside the cavity during pressing. In other words, the core also undergoes plastic deformation and must be made from a more ductile material than that of the part.

As a function of the particular case, the core and the sheath can be in one piece or separate. Moreover, the sheath and the core may or may not be covered by an anti-adhesive coating, which facilitates mold removal. Thus, the process can be applied to parts, where the core or the sheath form an integral part of the end product.

The part can in particular be made of a ceramic material. Reference is made to oxides ($Al_2O_3$, $CeO_2$, $ZrO_2$), borides ($TiB_2$), nitrides (TiN, TaN), carbides (TaC, NbC), silicides ($Si_3N_4$, SiC), and mixtures of such ceramics in order to produce granular compounds and composites with a ceramic matrix and fiber reinforcement. The invention is also applicable to composites having a metallic matrix and a metallic or ceramic reinforcement, as well as to metals and alloys which are not very ductile such as tungsten, pig iron and nickel-aluminum alloys.

The cores can be constituted e.g. of titanium, niobium or tantalum, when high temperatures have to be reached. It is also possible to use pure silica glass or boron oxide-enriched silicon. Such a material is marketed under the trademark VYCOR by Corning Corp. Other materials such as metals with a low melting point and glasses can be used when pressing takes place at lower temperatures.

The cavity can have different shapes. It can be a cylindrical cavity or a conically tapering cavity when mold removal is necessary. It is possible to envisage cavities with virtually no link with the outside, even if it is then necessary to remove the material from the core, which is then eliminated by chemical etching.

The material of the part to be densified is frequently powder, but can also be a material to be sintered or cold precompacted material.

The invention is described in greater detail hereinafter relative to non-limitative embodiments and the attached drawings, wherein:

FIG. 2 is a graph showing the temperature and pressure cycle used for this first embodiment.

FIGS. 3A to 3D show a second embodiment.

Figure 1A:
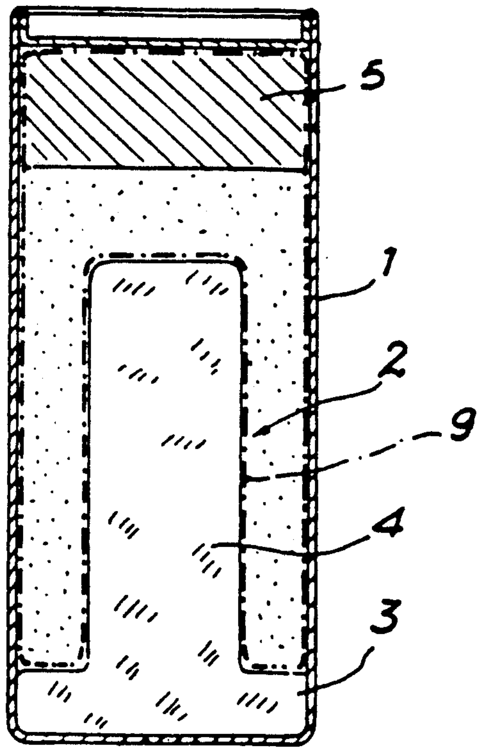
FIGS. 1A and 1B show a first embodiment.
Figure 1B:
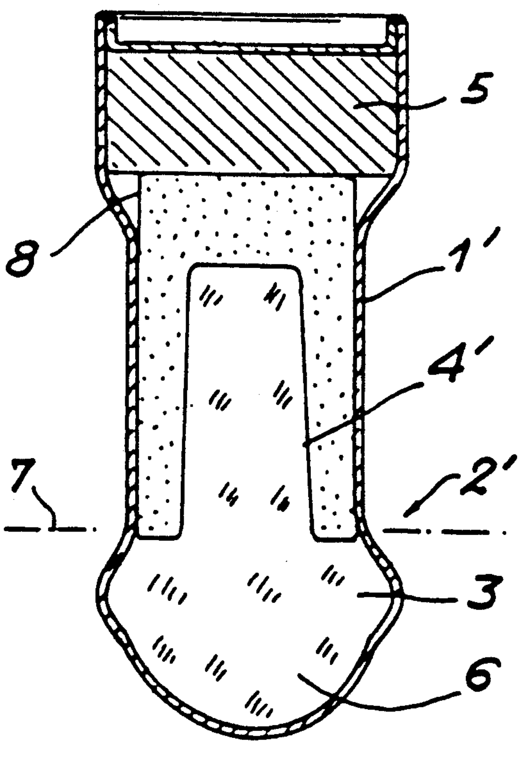

FIGS. 1A and 1B respectively show the shape of a titanium sheath and its content before and after pressing. In the initial state according to FIG. 1A, the sheath 1 has a cylindrical shape with a height of 104 mm and a diameter of 39.6 mm. It contains a titanium core 2 constituted by a 39.6 mm diameter and 9 mm high cylindrical base 3 placed on the bottom of the sheath 1 and surmounted by a 35 mm high truncated cone 4 tapering progressively towards the top of the sheath 1 to pass from a diameter of 22 to 20 mm. The interior of the sheath 1 is also occupied, unlike the bottom, by a 39.6 mm diameter and 20 mm high graphite wedge or shim 5. The remainder of the sheath is filled with tantalum carbide powder TaC for forming the part with the cavity. The inner face of the sheath 1 and the surface of the core 2 are covered with anti-adhesive material 9 in sheet form.

Following a cycle, shown in FIG. 2, which indicates as a function of the time in hours, the temperature and pressure curves T and P with a common scale in bars and degrees Celsius, the shape shown in FIG. 1B is obtained. The sheath has deformed and has in particular radially contracted about the part to be obtained (henceforth designated 1') and the core 2' has also changed shape. There remains a cone 4' with a smaller volume than the original cone 4, the material thereof having undergone an overall downward displacement, which appears in the form of a substantially hemispherical, 13 mm high bulge 6 below the base 3. The cone 4' has an approximate height of 25 mm and a diameter between 18 and 16.7 mm.

Referring to FIG. 1B, a crucible can be obtained by cutting off slightly above the base 3 along line 7, by mold removal of the cone 4', by mold removal of the sheath 1, after slitting it and removing the wedge 5, and by lathe machining of the part in its portion contiguous to the wedge 5, which has an annular bulge in the manner indicated by lines 8.

Wedges such as wedge 5 in FIGS. 1A and 1B are often encountered in this technical field, but they are not always useful and consequently their absence is perfectly compatible with a correct performance of the invention.

The invention gives rise to two favorable phenomena. Firstly, a deformable core ensures that the pressure is identical at all points within the sheath, which permits a more uniform densification of the part and which does not apply when a non-deformable core is used, in which case the pressure close to the core is higher than it is close to the sheath. Then, the downward bulge of the core limits the nipping of the sheath at the junction of the bottom and the cylindrical wall and therefore reduces the risk of breaking above the base 3.

Another embodiment is shown in FIGS. 3A to 3D. The sheath 10 is here significantly thicker and in one piece with a cylindrical core 11. Its external shape is cylindrical. The assembly is made from titanium and its interior is filled with precompacted tantalum carbide. In place of a thick sheath, it will be possible to have a thin sheath with an internal titanium coating.

The cord 12 obtained by hermetically crushing the filling neck of the sheath 10 is shown for accuracy reasons.

The initial state of the system is shown in FIG. 3A. FIG. 3B shows the final state after hot isostatic pressing and it can be seen that, as in the previous embodiment, there is a bulge 13 on the bottom of the sheath 10 which results from the partial extrusion of the core 11 in order to form a smaller cylindrical core 11'. The sheath, henceforth designated 10', is radially contracted around the tantalum carbide, while retaining a substantially cylindrical shape at this location.

FIG. 3C shows that a composite cylinder 14 can be obtained by smoothing the two end faces of the assembly, which in particular leads to the disappearance of the cord 12 and the bulge 13, so as to only leave a titanium envelope having a substantially uniform thickness around the tantalum carbide. Finally, FIG. 3D shows that a composite crucible 15 can be obtained by continuing the smoothing of the bottom of the composite cylinder 14 until the tantalum carbide is reached and then by making the core 11' disappear by an appropriate mechanical or chemical machining operation. The tantalum carbide is surrounded on its outer faces only by a titanium layer.

The process can also be applied to ductile materials for which the prior art processes can be used in principle. Such an application of the process according to the invention is in particular useful when the stresses to which the ductile materials will be exposed by the prior art processes are close to the breaking limit.

We claim:

1. Process for producing parts having a cavity, comprising the steps of:

filling a sheath with a powder, the sheath containing a core more voluminous than the cavity to be formed and the core being partially surrounded by the powder;

sealing the sheath; and applying an external pressure onto the sheath so as to radially contract the sheath, densify and sinter the powder into the part and plastically deform the core to allow the core to partially extrude out of the powder forming the part, the deformed core portion remaining in the part defining the cavity after partial extrusion of the core.

2. Process for producing parts according to claim 1, wherein the sheath and the core are in one piece, the core being removed from the part by machining after the partial extrusion.

3. Process for producing parts according to claim 1, wherein before the sheath is filled, anti-adhesive coating is placed to cover at least a portion of a surface area formed by an inner surface of the sheath and an outer surface of the core.

* * * * *